(12) United States Patent
Petrovic (10) Patent No.: US 10,050,680 B2
(45) Date of Patent: Aug. 14, 2018

(54) METHOD AND APPARATUS FOR REAL TIME MULTIPLEXING WITH TRANSMITTER AND ANTENNA ARRAY ELEMENTS

(75) Inventor: Branislav Petrovic, La Jolla, CA (US)

(73) Assignee: ENTROPIC COMMUNICATIONS, LLC, Carlsbad, CA (US)

( * ) Notice: Subject to any disclaimer, the term of this patent is extended or adjusted under 35 U.S.C. 154(b) by 753 days.

(21) Appl. No.: 12/889,967

(22) Filed: Sep. 24, 2010

(65) Prior Publication Data

US 2011/0299441 A1    Dec. 8, 2011

Related U.S. Application Data

(60) Provisional application No. 61/352,203, filed on Jun. 7, 2010.

(51) Int. Cl.
*H04B 7/00* (2006.01)
*H04B 7/0408* (2017.01)

(52) U.S. Cl.
CPC ............ *H04B 7/0408* (2013.01); *Y02D 70/00* (2018.01); *Y02D 70/142* (2018.01); *Y02D 70/444* (2018.01)

(58) Field of Classification Search
CPC .................................................. H04B 7/0408
See application file for complete search history.

(56) References Cited

U.S. PATENT DOCUMENTS

| | | | |
|---|---|---|---|
| 6,002,672 A * | 12/1999 | Todd | 370/252 |
| 6,381,286 B1 | 4/2002 | Wilkinson et al. | |
| 6,430,235 B1 * | 8/2002 | O'Shea et al. | 375/326 |
| 7,486,747 B1 | 2/2009 | Bagley et al. | |
| 7,508,737 B1 | 3/2009 | Alexandru | |
| 7,853,212 B2 * | 12/2010 | van Waasen | 455/42 |
| 7,904,034 B2 * | 3/2011 | Khan et al. | 455/114.2 |
| 2002/0024975 A1 * | 2/2002 | Hendler | H04B 1/0003 370/535 |
| 2002/0105975 A1 * | 8/2002 | Choi | 370/516 |

(Continued)

OTHER PUBLICATIONS

United States Patent and Trademark Office, Office Action, U.S. Appl. No. 12/882,879, dated Sep. 21, 2012.

(Continued)

*Primary Examiner* — Gregory Sefcheck
*Assistant Examiner* — Jael Ulysse
(74) *Attorney, Agent, or Firm* — McAndrews, Held & Malloy, Ltd.

(57) ABSTRACT

A method of signal processing, or corresponding apparatus, includes providing digital input signals representing beamforming data to be transmitted on respective antennas. One of the digital input signals is selected at a time among a plurality of times, to cycle through the digital input signals repeatedly and provide a multiplexed digital signal, which is converted to a multiplexed analog signal. The multiplexed analog signal is filtered to pass a predetermined frequency band and demultiplexed to provide analog output signals. One of the analog output signals is selected and provided to a corresponding antenna for transmission. Sharing a transmitter and DAC among multiple antennas results in reduced cost and power. Such cost and power reductions in turn enable larger antenna arrays than are available with prior art techniques, thereby promoting increased throughput and coverage.

22 Claims, 8 Drawing Sheets

(56) References Cited

U.S. PATENT DOCUMENTS

| | | | |
|---|---|---|---|
| 2002/0172231 A1* | 11/2002 | Claxton et al. | 370/537 |
| 2003/0083016 A1* | 5/2003 | Evans | H04B 7/0608 455/67.11 |
| 2003/0181170 A1* | 9/2003 | Sim | H04B 7/0408 455/101 |
| 2003/0185250 A1* | 10/2003 | Harberts et al. | 370/535 |
| 2003/0190897 A1* | 10/2003 | Lei | H04B 7/0408 455/101 |
| 2003/0223391 A1* | 12/2003 | Malaender et al. | 370/334 |
| 2004/0066803 A1* | 4/2004 | Talwalkar | H03M 3/474 370/535 |
| 2004/0085933 A1* | 5/2004 | Wang | H01Q 1/288 370/334 |
| 2004/0131011 A1* | 7/2004 | Sandell | H04L 1/0618 370/210 |
| 2004/0132496 A1* | 7/2004 | Kim | H04B 7/0669 455/562.1 |
| 2004/0266375 A1 | 12/2004 | Li et al. | |
| 2005/0094714 A1* | 5/2005 | Robinson | H04B 1/0483 375/148 |
| 2005/0105632 A1* | 5/2005 | Catreux-Erces et al. | 375/267 |
| 2005/0141406 A1 | 6/2005 | Maltsev et al. | |
| 2005/0141644 A1* | 6/2005 | Sadowsky | H04L 25/03216 375/324 |
| 2005/0185575 A1* | 8/2005 | Hansen | H04B 7/0613 370/208 |
| 2005/0254596 A1* | 11/2005 | Naguib | H04L 1/0618 375/299 |
| 2006/0072514 A1* | 4/2006 | Kent et al. | 370/335 |
| 2006/0153319 A1* | 7/2006 | Gorsuch | H04B 7/08 375/347 |
| 2006/0239366 A1* | 10/2006 | Kim | H04B 7/0408 375/260 |
| 2007/0104283 A1* | 5/2007 | Han | H04B 7/0408 375/260 |
| 2007/0111676 A1* | 5/2007 | Trachewsky | H04B 1/0003 455/101 |
| 2007/0135052 A1* | 6/2007 | Park | H04B 7/0617 455/63.1 |
| 2007/0201566 A1* | 8/2007 | Solomon | H04B 7/0417 375/260 |
| 2007/0218854 A1 | 9/2007 | Lawrence et al. | |
| 2007/0258541 A1* | 11/2007 | Yamaura | H04B 7/0408 375/267 |
| 2008/0075187 A1* | 3/2008 | Sutskover | H04B 7/0691 375/267 |
| 2008/0075194 A1* | 3/2008 | Ravi et al. | 375/297 |
| 2008/0081567 A1* | 4/2008 | Rofougaran | H04B 7/10 455/78 |
| 2008/0084951 A1 | 4/2008 | Chen et al. | |
| 2008/0155636 A1 | 6/2008 | Cruz et al. | |
| 2008/0198048 A1* | 8/2008 | Klein et al. | 341/110 |
| 2009/0034448 A1 | 2/2009 | Miller et al. | |
| 2009/0046790 A1* | 2/2009 | Soliman | 375/260 |
| 2009/0103486 A1* | 4/2009 | Hunukumbure | H04B 7/0413 370/329 |
| 2009/0103593 A1 | 4/2009 | Bergamo | |
| 2009/0110088 A1 | 4/2009 | Giandomenico et al. | |
| 2009/0231197 A1* | 9/2009 | Richards | H01Q 3/2682 342/377 |
| 2009/0239551 A1* | 9/2009 | Woodsum | H04B 7/086 455/456.1 |
| 2009/0245431 A1* | 10/2009 | Challa et al. | 375/340 |
| 2009/0310506 A1* | 12/2009 | Li et al. | 370/252 |
| 2010/0008406 A1* | 1/2010 | Sawai | H04B 17/21 375/219 |
| 2010/0020857 A1* | 1/2010 | Takano | H04B 17/21 375/219 |
| 2010/0020891 A1* | 1/2010 | Takano | H04L 25/0204 375/260 |
| 2010/0020907 A1* | 1/2010 | Rezvani | H04B 7/0848 375/347 |
| 2010/0054200 A1* | 3/2010 | Tsai | H04B 7/0408 370/329 |
| 2010/0085245 A1* | 4/2010 | Fischi | G01S 7/006 342/195 |
| 2010/0093282 A1 | 4/2010 | Martikkala et al. | |
| 2010/0123621 A1 | 5/2010 | Craig et al. | |
| 2010/0136922 A1* | 6/2010 | Rofougaran | H04B 7/0871 455/73 |
| 2010/0216412 A1* | 8/2010 | Rofougaran | H04B 1/406 455/78 |
| 2010/0309848 A1* | 12/2010 | Erceg | H04W 72/0453 370/328 |

OTHER PUBLICATIONS

International Search Report and the Written Opinion for International App No. PCT/US2011/039404, completed Sep. 27, 2011.
Supplementary European Search Report for EP 11793021, dated Dec. 17, 2015, 2 pages.

* cited by examiner

METHOD AND APPARATUS FOR REAL TIME MULTIPLEXING WITH TRANSMITTER AND ANTENNA ARRAY ELEMENTS

CROSS-REFERENCE TO RELATED APPLICATION

This application claims priority under 35 U.S.C. § 119(e) from Provisional Application Ser. No. 61/352,203, filed Jun. 7, 2010, the entirety of which is hereby incorporated by reference herein.

FIELD

This disclosure is directed generally to communication of broadband communication signals, and more particularly, some embodiments relate to sharing antennas.

BACKGROUND

In a typical home networking scenario, both high spatial coverage (e.g., coverage to various parts of the home) and high temporal coverage (e.g., coverage nearly 100% of the time) are desirable. Wireless communications often exhibit high temporal variation, which may be due to interference (in-band or out-of-band) and/or multipath characteristics. Multiple input multiple output (MIMO) techniques are sometimes used to increase capacity through multiple spatial channels and beamforming techniques, e.g., in the IEEE 802.11n standard. In a MIMO system, beamforming to point either a transmission or reception in a certain direction is accomplished in a similar manner to that done using a dish antenna. That is, a continuous surface can be approximated using a number of smaller antennas rather than a large dish antenna. Each of the smaller antennas are collocated near one another and fed with signals having predetermined phase relationships. The antenna separation is typically on the order of a quarter wavelength at the frequency of operation. For a WiFi frequency of 5.8 GHz, for example, the antennas are separated by a few inches. The various antennas exploit spatial diversity, e.g., using different transmit angles. An N×N matrix having N transmit antennas and N receive antennas is provided in MIMO systems and is well known to one of ordinary skill in the art. Assuming multipath allows for N different independent or uncorrelated paths between a transmitter and a receiver, N antennas can sustain a maximum of N spatial channels, if the channels are uncorrelated. Each such transmit antenna transmits a linear combination of N bit streams according to the N×N matrix. If the channels are partially correlated, the number of available spatial channels drops. For example, with 50% correlation, half the spatial channels are unavailable.

Beamforming is a technique used in MIMO antenna arrays for directional signal transmission or reception. Beamforming may increase the link margin and improve the coverage and range. Spatial selectivity is achieved by using either an adaptive or a fixed receive/transmit beam pattern. High spatial selectivity through beamforming is achieved with a large number of antennas located close to one another. A traded-off exists between increasing the capacity by exploiting several spatial channels and increasing the coverage by improving the link budget with beamforming.

Known MIMO communication techniques allow up to 4 transmit antennas and 4 receive antennas. Such configurations do not provide enough throughput for reliable, high-performance networking in a home environment. For example, with a 4×4 MIMO configuration having two spatial channels and beamforming, 100% spatial coverage at any location in a home may be available for a throughput of about 20-30 Mbps, but less than 90% coverage may be possible for a throughput of 50 Mbps or more. Future throughput needs are likely to be on the order of 100 Mbps or more, so more than four transmit antennas (e.g., eight or more transmit antennas) are likely to be required for the performance sought.

In some communication systems involving multiple transmit antennas, each antenna has a dedicated transmitter and digital to analog converter (DAC). In the case of zero intermediate frequency (zero-IF) or a direct conversion architecture, two DACs used (one for the in-phase and one for the quadrature components, respectively).

Figure 1:
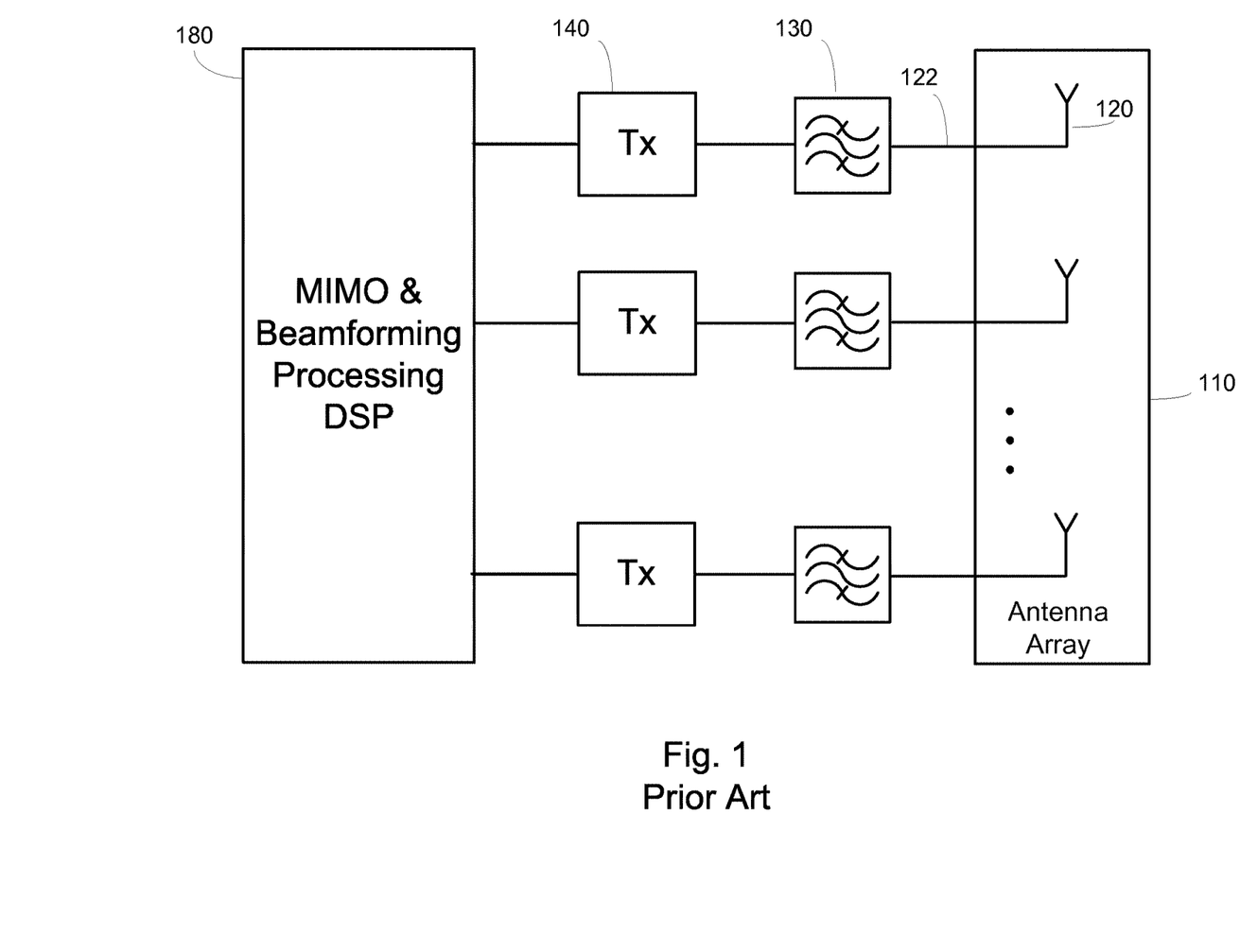
FIG. 1 is a block diagram of a communication apparatus having an antenna array and a multiplicity of transmitters.

FIG. 1 is a block diagram of a communication apparatus in which a digital signal processor (DSP) 180 performs processing associated with MIMO spatial multiplexing. The DSP also performs beamforming on antenna data samples and provides beamformed data to transmitters 140. Three antennas 120 and three transmitters 140 are shown in a parallel. The outputs of the transmitters 140 are provided to respective bandpass filters 130. The filters provide filtered analog signals 122 to the antennas in an antenna array 110.

Such multiplicity of transmitters and DACs as in FIG. 1 results in high cost and power, which increases proportionally with the number of antenna elements in the array 110. Thus, with conventional techniques large antenna arrays (e.g., arrays having more than a few transmit antennas) may be impractical due to the cost and amount of power required.

SUMMARY

In some embodiments of the disclosed method and apparatus, a plurality of digital input signals represent beamforming data to be transmitted on a plurality of antennas. One digital input signal is selected at a time. The selection cycles through the plurality of digital input signals repetitively and generates a multiplexed digital signal. The multiplexed digital signal is converted to a multiplexed analog signal. The multiplexed analog signal is filtered through a filter that passes a predetermined frequency band. The multiplexed analog signal is demultiplexed to provide a plurality of analog output signals. Accordingly, at least one of the analog output signals is selected. The analog output signals are selected one at a time. Each selected analog output signal is provided to a corresponding one of the antennas.

Some embodiments include a digital processing module, a transmitter, a demultiplexer, and multiple antennas. The digital processing module has a multiplexer selects one input signal at a time. The selection cycles through the plurality of input signals repetitively. This process outputs a multiplexed digital signal based on the selection among the digital input signals. The transmitter has a digital to analog converter (DAC) converts the multiplexed digital signal into a multiplexed analog signal. The transmitter also has a bandpass filter that passing a predetermined frequency band. The demultiplexer demultiplexes the multiplexed analog signal to provide a plurality of analog output signals. Each antenna transmits one of the analog output signals.

Some embodiments have a digital processing module, a transmitter, a demultiplexer, multiple filters, and multiple antennas. The multiplexer selects one input signal at a time. Each input signal represents beamforming data. The selection process cycles through the input signals repetitively. The multiplexer outputs a multiplexed digital signal, the composition of which is based on which input signals were selected. The transmitter has a DAC that converts the multiplexed digital signal into a multiplexed analog signal. The demultiplexer demultiplexes the multiplexed analog signal to provide a plurality of analog output signals. Each analog output signal is applied to one of the filters. Each antenna transmits one of the filtered analog output signals.

Some embodiments have a digital processing module, multiple transmitters, multiple demultiplexers, and multiple antenna arrays. In some such embodiments, each multiple antenna array has several antenna elements. The digital processing module has multiple multiplexers. Each multiplexer selects digital input signals from among a plurality of input signals that are part of a signal chain associated with one antenna array. The digital input signals of the associated with each array represent beamforming data. The selection process cycles repeatedly through the digital input signals. It can be seen that each multiplexer outputs a multiplexed digital signal comprising those signals that were selected. Each transmitter has a DAC that converts a corresponding multiplexed digital signal into a multiplexed analog signal. Each transmitter also has a bandpass filter that is applied to the corresponding multiplexed analog signal. The output of each filter is coupled to a corresponding one of the demultiplexers. Each demultiplexer demultiplexes the multiplexed analog signal output from the corresponding filter. Each demultiplexer outputs a group of analog output signals. The outputs of each demultiplexer are coupled to the inputs of one of the antenna arrays. The antennas within the antenna arrays transmit the corresponding group of analog output signals.

BRIEF DESCRIPTION OF THE DRAWINGS

The disclosed method and apparatus, in accordance with one or more various embodiments, is described with reference to the following figures. The drawings are provided for purposes of illustration only and merely depict examples of some embodiments of the disclosed method and apparatus. These drawings are provided to facilitate the reader's understanding of the disclosed method and apparatus. They should not be considered to limit the breadth, scope, or applicability of the claimed invention. It should be noted that for clarity and ease of illustration these drawings are not necessarily made to scale.

It should be understood that the disclosed method and apparatus can be practiced with modification and alteration, and that the invention should be limited only by the claims and the equivalents thereof.

DETAILED DESCRIPTION

This description of the disclosed embodiments is intended to be read in connection with the accompanying drawings, which are to be considered part of the entire written description.

A method and apparatus is disclosed in which a transmitter and a digital to analog converter (DAC) are shared between different antenna elements in real time. Processing, including interpolation, is performed to achieve time alignment and/or shifting to enable proper multiplexing and demultiplexing. Sharing the transmitter and DAC among multiple antennas results in a reduction in cost and power. It is well known in the semiconductor industry that, while digital circuits scale well (become smaller in size and use less power) when used with advanced semiconductor technology (e.g., smaller geometry size), the scaling is not as efficient for analog circuitry. Replacing several analog transmitters with a single, shared transmitter overcomes this limitation. Resulting cost, complexity and power reductions in turn enable larger antenna arrays, thus overcoming the shortcomings of the prior art.

Figure 2:
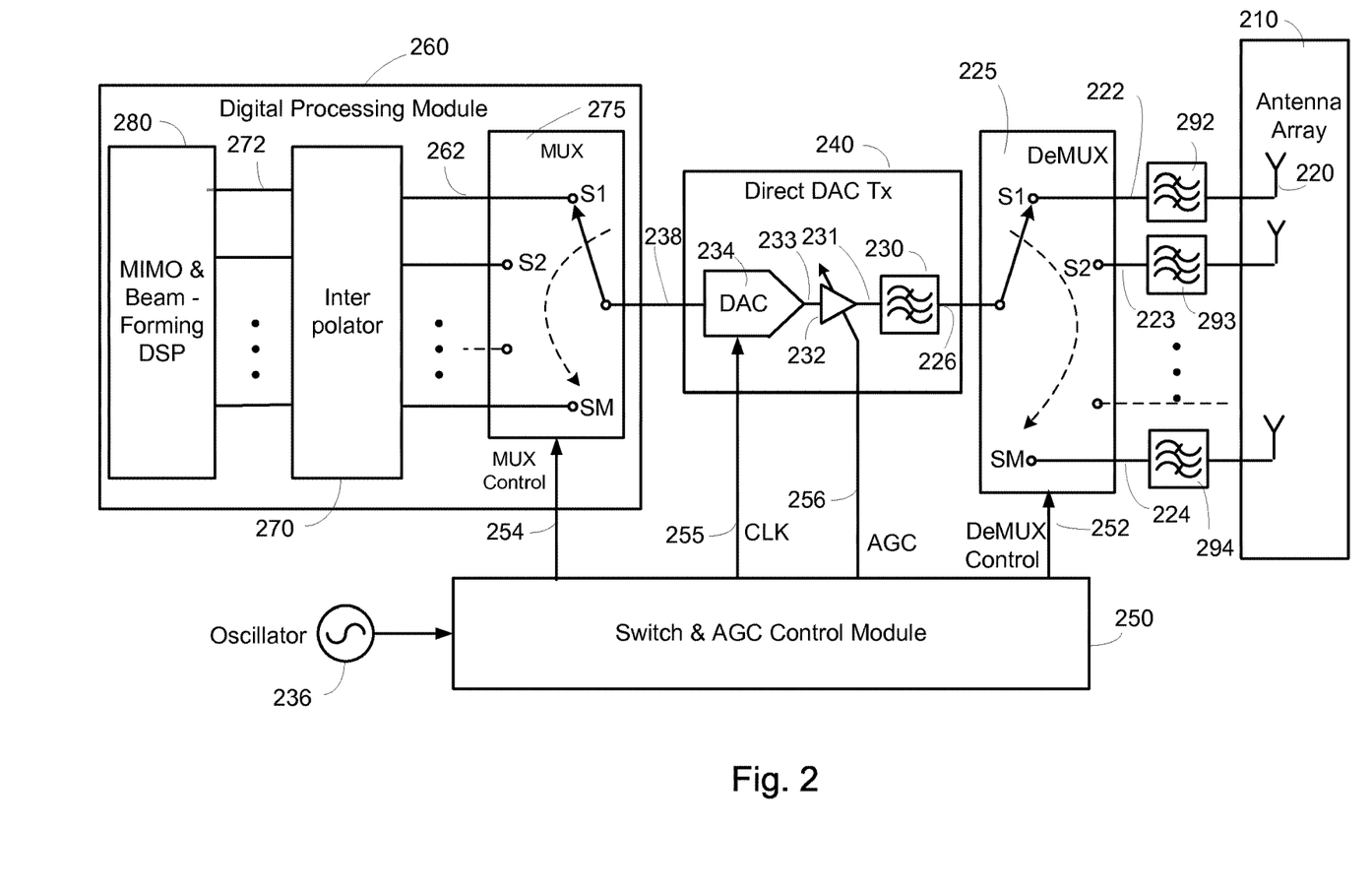
FIG. 2 is a block diagram of a communication apparatus having multiplexed antennas with a direct digital to analog converter (direct DAC) transmitter architecture.

FIG. 2 is a block diagram of a communication apparatus having multiplexed antennas with a direct digital to analog converter transmitter architecture (direct DAC). The architecture of the apparatus in FIG. 2 is referred to as a direct DAC transmitter architecture because the DAC output 233 is processed directly without upconversion to a higher output frequency.

A digital processing module 260 includes a multiple-in-multiple-out (MIMO) and beam forming Digital Signal Processor (DSP) 280, an interpolator 270 and a multiplexer (mux) 275. The DSP 280 provides a set of digital signals that, when applied to an antenna array, will create a directed transmission beam. The interpolator 270 offsets the sample times to align the sample time with the time during which the sample stream is selected by the mux 275, as will be seen further below.

The mux 275 selects one of the digital input signals 262 output from the interpolator 270. One signal is selected at a time. The mux 275 selects from among the various digital input signals 262 in a repetitive manner. That is, if there are M signals 262 output by the interpolator 270, then the mux 275 will select the first one for a first period of time, then move on to the second one for a second period of time, etc., until all of the signals have been selected. The process will then repeat. The amount of time that the mux 275 selects each digital input signal 262 may be equal to one sample time or it may be equal to several sample times. It should be understood that the particular order in which the signals are selected is not relevant to the invention. However, the order and timing must be synchronized with the demux 525.

The mux 275 is shown in position S1, selecting the first digital input signal 262. At another time, the switch is at position S2, and at other times the switch is at other positions up to position SM. In this embodiment, the number of switch positions equals the number of antennas in an antenna array 210, which may be any number greater than one. The mux 275 outputs a multiplexed digital signal 238 based on the selected digital input signals 262. The output 238 of the Digital Processing Module 260 is coupled to a Direct DAC Transmitter 240. The Direct DAC Transmitter 240 comprises a DAC 234, an automatic gain controller (AGC) 232, and a filter 230.

The DAC 234 converts the multiplexed digital signal 238 into a multiplexed analog signal. In the case in which the mux 275 selects one digital input signal for more than one sample time, the DAC 234 will convert the multiple samples from the first digital input signal before the samples of the next digital signal are coupled to the DAC 234 by the mux 275.

The multiplexed analog signal is coupled through the AGC 232 and the filter 230 to a demultiplexer (demux) 225. The AGC 232 is inserted into the signal path in one embodiment of the disclosed method and apparatus to optimize the dynamic range and performance of the transmitter 240. The AGC 232 may be dynamically switched and synchronized to the mux sampling rate to ensure correct signal strength of each antenna element. The AGC is shown in FIG. 2 as being disposed between the DAC 234 and the filter 230, but it may be disposed between the filter 230 and the demux 225, as one of ordinary skill in the art will appreciate. The advantage would be potentially better impedance presented to the antenna and source impedance to the filter. However, placing the AGC there comes at the expense of a potentially higher dynamic range requirement for the amplifier, which may be necessary to keep out of band distortion terms low, since there may be less or no filtering before the antennas. The term "multiplexed analog signal" may refer to the input 226 to the demux 225, the input 231 to the filter 230, or the input 233 to the AGC 232, as one of ordinary skill in the art understands that filtering a signal or varying its gain do not change the analog nature of a signal or its multiplexed nature. The input 238 to the DAC 234 is referred to as a multiplexed digital signal.

The number of switch positions in the demux 225 is equal to the number of switch positions in the mux 275. The demux 225 switches between the switch positions in a manner corresponding to the switching at the mux 275. The switch positions of the mux 275 and demux 225 are given like labels to indicate such switching correspondence. The demux provides multiple analog output signals 222 to antennas (antenna elements) 220 in an antenna array 210. Thus, the antennas 220 in the antenna array 210 transmit data that has been multiplexed and demultiplexed to allow sharing of the transmitter 240 amongst all the antennas 220.

In accordance with one embodiment of the disclosed method and apparatus, the sampling rate of the DAC 234 is greater than 2*M*BW, where M is the number of antennas 220 and BW is the signal bandwidth. This is the Nyquist criteria multiplied by the number of antennas, as can be seen by the fact that the DAC 234 preferable processes data corresponding to each of the M antennas 220 at a rate of at least 2*BW.

In general, the increased sampling rate noted above is easier to achieve when the signal bandwidth is narrower. In one such example, the signal has a relatively narrow bandwidth of 40 MHz (such as in Wi-Fi IEEE 802.11n). For M=10 antennas, an equivalent bandwidth of 400 MHz (M*BW=10*40 MHz=400 MHz) is sampled. The sample rate is at least twice the frequency of the signal to be sampled, i.e., a sample rate is at least 800 MHz. This is readily achievable with contemporary DAC technology, assuming the effective number of bits (ENOB) is approximately 8, with a single (non-interleaved) DAC. The ENOB is a measure of the quality of a digitized signal.

In one embodiment of the disclosed method and apparatus, the demux 225 is controlled by a demux control signal 252 that is generated by a Switch & AGC Control Module 250. The Switch & AGC Control Module 250 receives an input from an oscillator 236. The Control Module 250 controls the demux 225 to select one antenna at a time (i.e., to cycle through the antennas 220 in the array 210). FIG. 2 shows a point in time at which the demux 225 has selected antenna a first antenna 220. The demux 225 provides an output signal 222 during the time shown in FIG. 2.

In one embodiment, the Transmitter 240 includes a bandpass filter 230 placed before the demux 225, as shown in FIG. 2. The filter 230 has sufficient bandwidth to pass the M switched signals 222, 223, 224 in due time. Since the signals 222, 223, 224 coupled to each antenna 220 are switched (or chopped) the signals 222, 223, 224 may not be time-continuous. Thus, the signals 222, 223, 224 may potentially have spectral components spreading outside of the channel band. Before it is radiated, the signals 222, 223, 224 may need to be reconstructed by a bandpass filter in a manner similar to a DAC reconstructed by a reconstruction or anti-aliasing filter. In one embodiment, each antenna element 220, with its inherent bandpass properties, may be optimized in conjunction with the switching speed and dwell time in each position of a preceding demux stage to serve as a reconstruction filter. In another embodiment, separate filters 292, 293, 294 are inserted between the demux 225 and the respective antennas 220, as shown in FIG. 2.

Figure 3A:
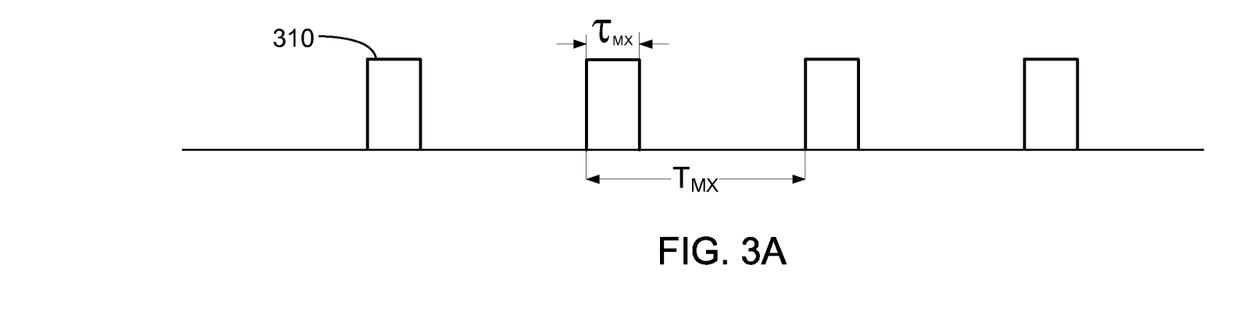
FIGS. 3A-E illustrate processing associated with a multiplexed signal spectrum in accordance with some embodiments. 6A: Demultiplexing control signal time domain waveform; 6B: Demultiplexing control signal spectrum; 6C: Signal spectrum before demultiplexing; 6D: Signal spectrum after demultiplexing; 6E: radiated signal spectrum after filtering by antenna and/or post demultiplexer filters.
Figure 3B:
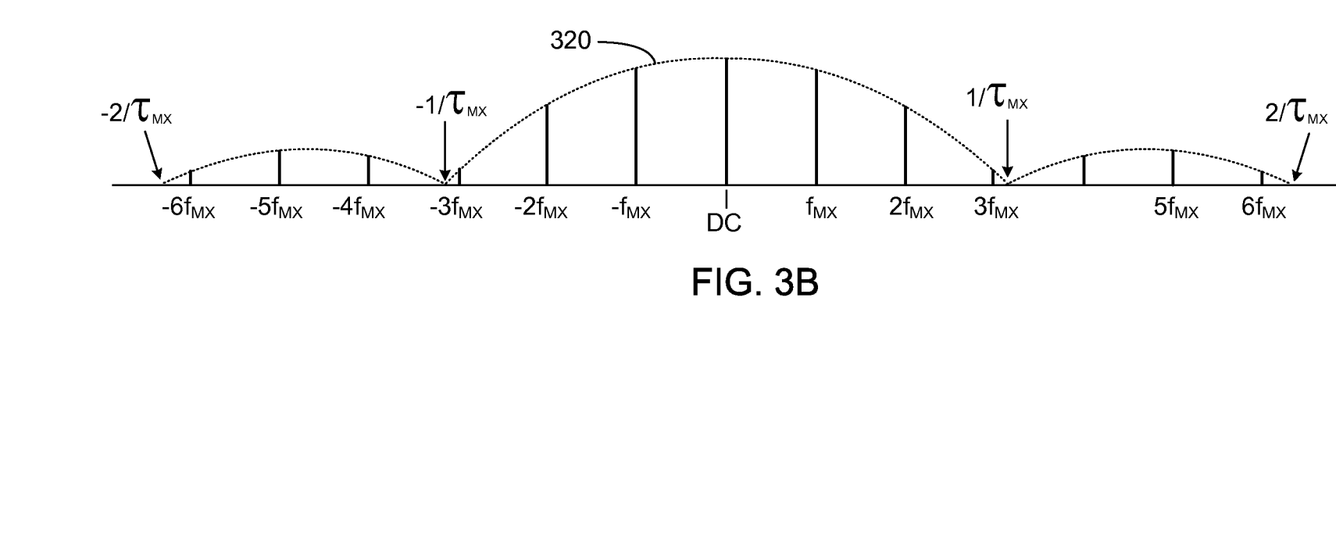

FIGS. 3A-E provide spectral characteristics of the signals described above with respect to FIG. 2. FIG. 3A shows the time domain waveform of the demux control signal 252 of FIG. 2. The demux control signal 310 is comprised of pulses spaced at intervals of $T_{MX}$, with each pulse having a width of $\tau_{MX}$. The frequency spectrum of the demux control signal 252, with spectral lines spaced at $f_{MX}=1/T_{MX}$, conforms to a sinc envelope 320. Nulls exist at $1/\tau_{MX}$ and its multiples, as shown in FIG. 3B.

Figure 3C:
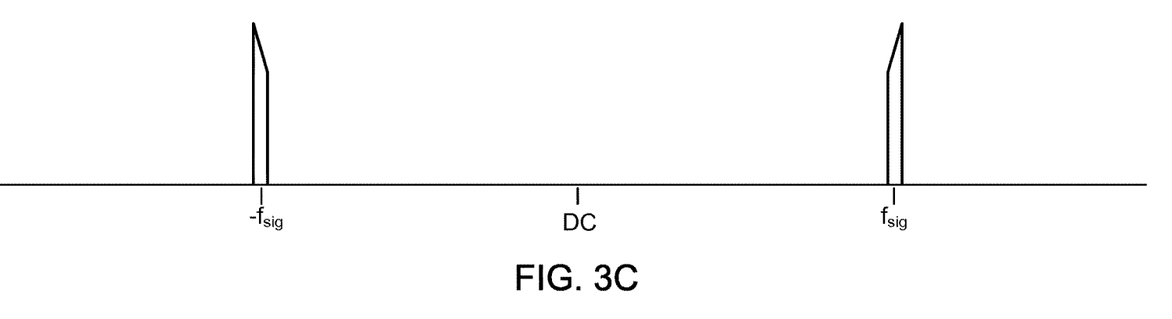
Figure 3D:
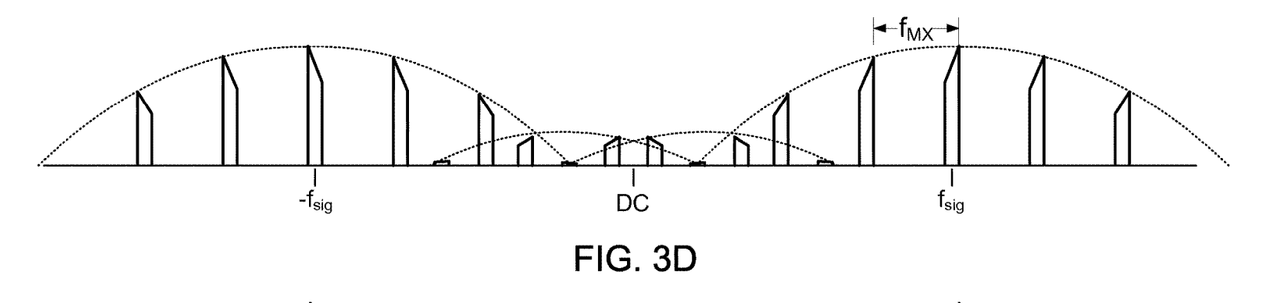
Figure 3E:
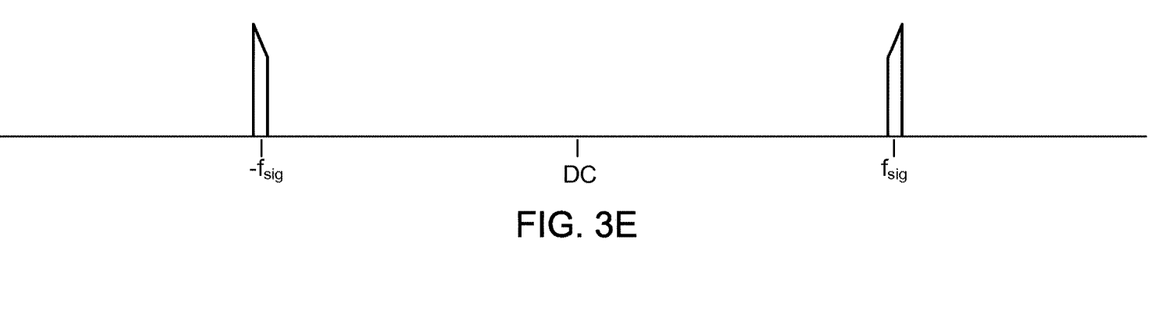

FIG. 3C shows the spectrum of the signal 226 (i.e., the output from the filter 230 prior to demultiplexing). FIG. 3D shows the spectrum of the signals 222, 223, 224 after demultiplexing. FIG. 3E shows a radiated signal spectrum after filtering by an antenna and/or a bandpass filter (e.g., filter 292) between a demux and an antenna. To comply with regulatory requirements, out-of-band spectral content may be limited prior to radiation. The in-band radiated power (i.e., the desired channel power that is actually radiated by each antenna element) is also affected by the chopping action of the demux. That is, the radiated power of each element is reduced by an amount substantially equal to the duty cycle of the control signal (i.e., by a factor of $\tau_{MX}/T_{MX}$). However, the total power radiated by all antenna elements in aggregation is substantially equal to a full signal power, as is the case if a continuous ("un-chopped") signal was radiated via a single antenna element. This is generally consistent with regulatory rules, which in principle, do not allow an increase in the radiated power when the number of antennas is increased.

High sinc lobes (images) may fall close in frequency to a desired signal. The higher the ratio $f_{sig}/f_{MX}$, the lower the image levels may be, where $f_{sig}$ is the output signal frequency and $f_{MX}=1/T_{MX}$. An integer ratio of $f_{sig}/f_{MX}$ may be used to place the images underneath the signal, thus avoiding close proximity of images to the desired signal. Such close proximity makes the filtering difficult. By avoiding having the images in close proximity to the desired signal, the in-channel signal-to-noise ratio (SNR) can be reduced. That is, if the image is located in-channel, it will degrade the SNR. For a transmitter, such degraded SNR may be acceptable, depending on the required modulation error rate (MER) for digital transmission. For example, a MER of 40 dB is typically acceptable for 1024-point quadrature amplitude modulation (1024-QAM), so as long as image levels are below −40 dBc, e.g. −50 dBc. In this case the images are underneath the signal and may be acceptable.

We turn now to the control signals generated by the Switch & AGC Control Module 250. In one embodiment, the DAC sampling clock signal (CLK) 255 is coherent and time synchronized/aligned with the demux control signal 252. This ensures that each signal that is sampled by the mux 275 is properly routed by the demux 225 to the appropriate antenna element 220. In one embodiment, the CLK 255 is also coherent or phase-locked with the mux control signal 254. In another embodiment, the DAC clock is free-running (not coherent) with respect to either the demux control signal 252 or the mux control signal 254. The Control Module 250 provides the necessary clocking and timing generation functionality, and generates the demux control signal 252 and the mux control signal 254, as well as AGC control signal (AGC) 256 to control the AGC 232. Those skilled in the art will understand how the Control Module 250 operates based upon the information provided herein. For correct synchronization of the demux 225 and mux 275, the timing in the Control Module 250 of demux control signal 252 and the mux control signal 254 must account for a delay in the digital to analog conversion process in the DAC 234. Implementation details of the Control Module are known to those skilled in the art.

In some embodiments, the demux 225 cycles through its positions (S1 through SM). Accordingly, at any given time only one antenna is active and terminated into the DAC 234. All other antennas (i.e., the other M−1 antennas) are inactive and opened (i.e., floating and not loaded into a termination). When disconnected, the non-active antenna elements exert less loading on the selected (active) antenna element. This is true in spite of any mutual coupling that may exist between the antenna elements. Disconnecting the inactive antenna elements effectively isolates the active antenna element from the inactive antenna elements. The increased isolation between antenna elements 220 enhances the MIMO performance of the array 210. In contrast, in the prior art all antenna elements 120 are active (terminated) all the time, resulting in less isolation and causing each to affect the other through mutual coupling.

Figure 4:
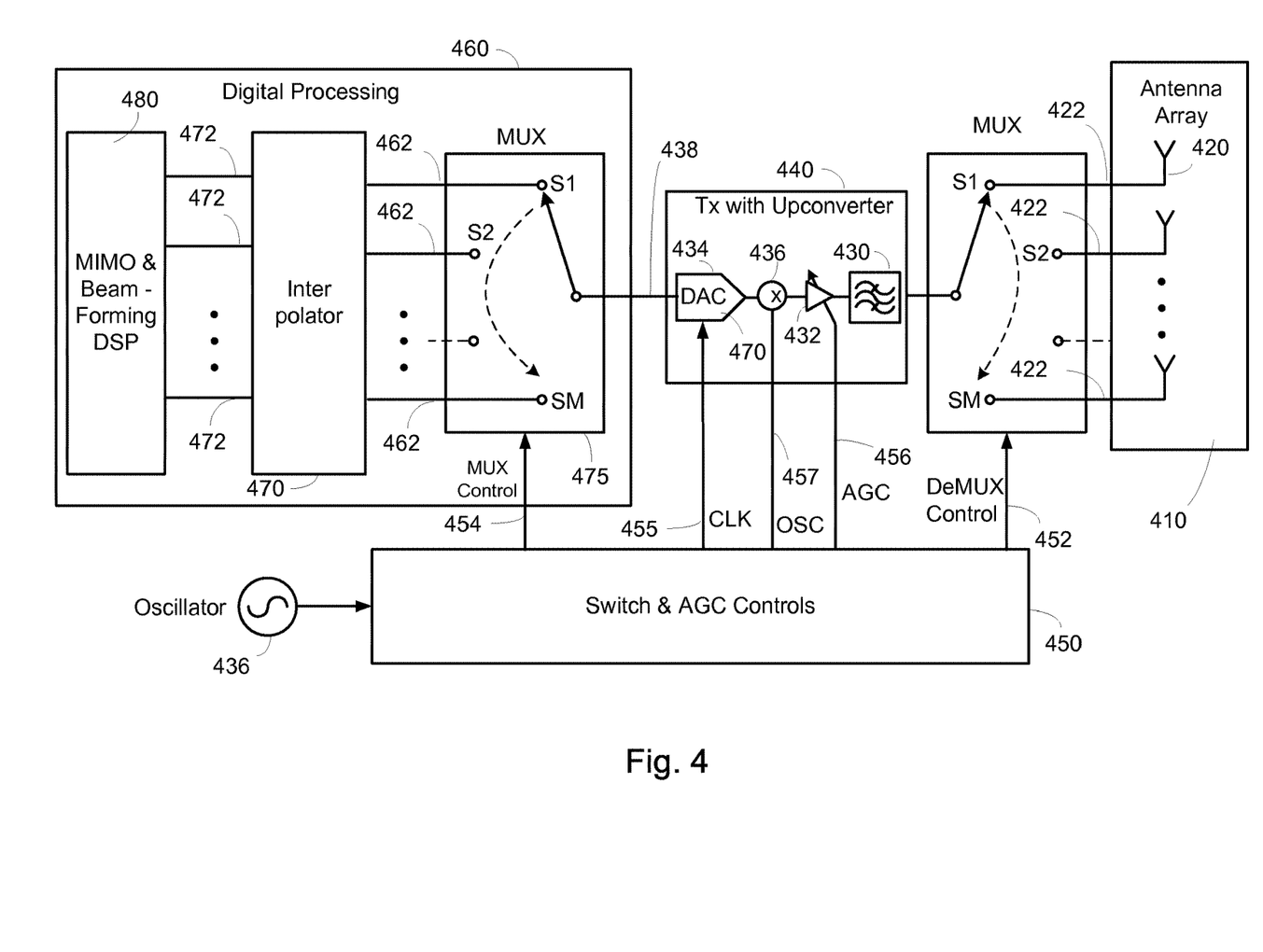
FIG. 4 is a block diagram of a communication apparatus having multiplexed antennas with an upconverter DAC transmitter architecture.

FIG. 4 is a block diagram of a communication apparatus having an antenna array 410 with antenna elements 420 that share a common transmitter 440. The transmitter 440 has a DAC 434 and an upconverter (mixer) 436. Several aspects of the apparatus shown in FIG. 4 are similar to those of the apparatus shown in FIG. 2. Accordingly, only the differences are discussed below for the sake of brevity. Like reference characters are assigned to like elements (relative to FIG. 2), with a leading digit "4" instead of "2", e.g., antenna array 410 compared to antenna array 210 of FIG. 2. In embodiments that include an optional automatic gain controller (AGC) 432, the upconverter 436 is located between the DAC and the AGC 432 (as shown in FIG. 4). Another AGC (not shown in FIG. 4) may be inserted between the DAC 434 and the upconverter 436 to increase dynamic range, if needed. The upconverter 436 receives a local oscillator signal OSC 457 from a Switch ACG Control Module 450. Further discussion of the other elements of FIG. 4 is not necessary, as such elements are understood by one of ordinary skill in the art based on the discussion above regarding FIG. 2.

Figure 5:
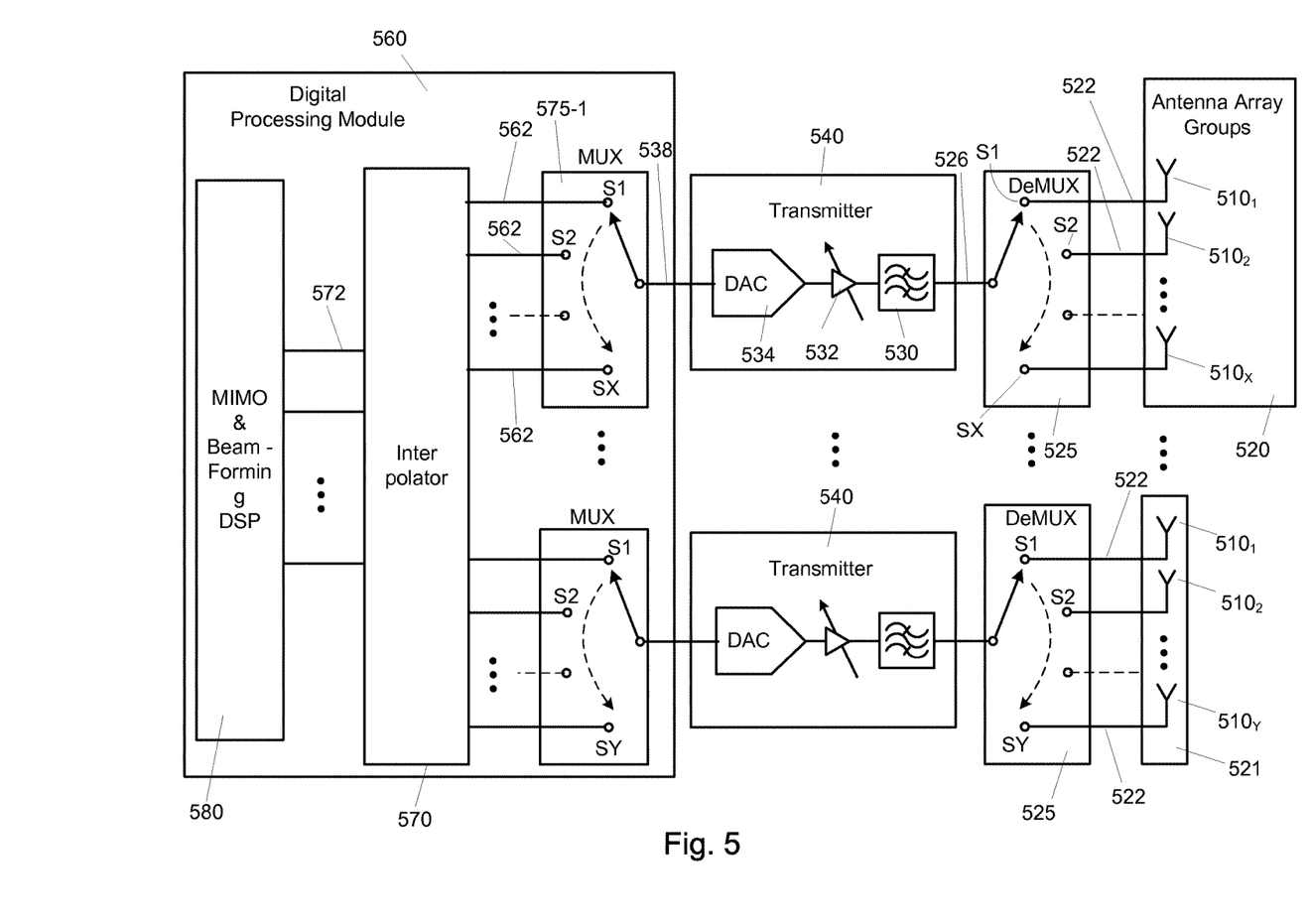
FIG. 5 is a block diagram of a communication apparatus having antenna arrays and multiple transmitters and DACs.

FIG. 5 is a block diagram of a communication apparatus having a digital processing module 560, a plurality of transmitters 540, a plurality of demuxs 525 and a plurality of antenna arrays 520, 521. Several aspects of the apparatus in FIG. 5 are similar to those of the apparatuses in FIGS. 2 and 4. Therefore, only differences are discussed below for the sake of brevity.

The digital processing module 560 includes a MIMO and beam forming Digital Signal Processor (DSP) 580, an interpolator 570 and a plurality of muxes 275. Each transmitter 540 includes a DAC 524. The antenna elements 510 are grouped into several antenna arrays 520, 521. Each antenna array 520, 521 is part of a signal chain that includes a corresponding one mux 575, one transmitter 540, and one demux 525, such that there is a one to one correspondence between muxes 575, transmitters 540, demuxs 525 and antenna arrays 520, 521. The size of the arrays 520, 521 (i.e., the number of antennas in each array 520, 521) may be optimized to match the capabilities of the associated DAC 534, and/or vice versa. The antenna arrays 520, 521 may have different numbers of antennas 510 (e.g., X antennas in the first array 520 and Y antennas in the second array 521. It will be clear that while only two arrays 520, 521 are shown, there can be several such arrays. As is the case in the embodiments discussed above, such as the embodiment shown in FIG. 2, the number of switch positions in a mux 575 and in a demux 525 is equal to the number of antenna elements 510 in the corresponding antenna array 520, 521.

As noted above, there is one mux 575, one transmitter 540 and one demux 525 associated with each corresponding antenna array 520, 521. FIG. 5 shows transmitters 540 in a "direct DAC" architecture. However, in another embodiment, the transmitters have an "upconverter DAC receiver" architecture. The digital processing module 560 includes a plurality of muxs 575 coupled to corresponding DACs 534. Each mux 575 receives a unique plurality of digital input signals 562 at its input. The number of digital input signals 562 within each unique plurality of digital input signals 562 is equal to the number of outputs of a corresponding demux 525 and to the number of antenna elements 510 in the corresponding antenna array 520, 521.

In an embodiment, the DSP 580 performs MIMO and beamforming processing to align antenna data samples corresponding to respective antenna elements of each array 520, 521. In so doing, the DSP 580 provides digital streams 572, the total number of which is equal to the number of antenna elements 510 in all the antenna arrays 520, 521. As will be discussed in more detail below with respect to FIG. 6, an interpolator 570 performs interpolation to provide the digital signals to all the muxs 575 at respective times. In other embodiments, the block 570 is absorbed within the DSP 580 as part of the MIMO/beamforming processing.

In some embodiments (not shown), individual filters 292 are provided between each antenna element 220 and the demux 225 in FIG. 2. Individual filters 292 may be provided in a direct DAC transmitter architecture as in FIG. 2, an upconverter DAC transmitter architecture as in FIG. 4 (not shown), or a grouped configuration as in FIG. 5 (not shown). Using individual filters may eliminate the need for a filter (e.g., filter 230, 430, or filters 530) at the transmitter. In other embodiments, individual filters are provided for each antenna element and a common filter is also provided at a transmitter. Such an architecture enables the individual filters to have a lower order than they would ordinarily have. This also allows the common filter to have a wider bandwidth and/or lower order than it would ordinarily have. Thus, a common filter in this case may have a bandwidth wider than M*BW, where M is the number of antennas and BW is the signal bandwidth, and still provide sufficient filtering. Higher order filters have steeper transition bands and longer delays than lower order filters. Using lower order filters for individual filters corresponding to respective antennas promotes speed and reduces circuit complexity and cost.

In some embodiments, a mux (e.g., any of the muxs 275, 475, 575) dwells at a given switch position long enough to receive multiple digital samples from an digital input signal before proceeding to a next switch position.

Figure 6:
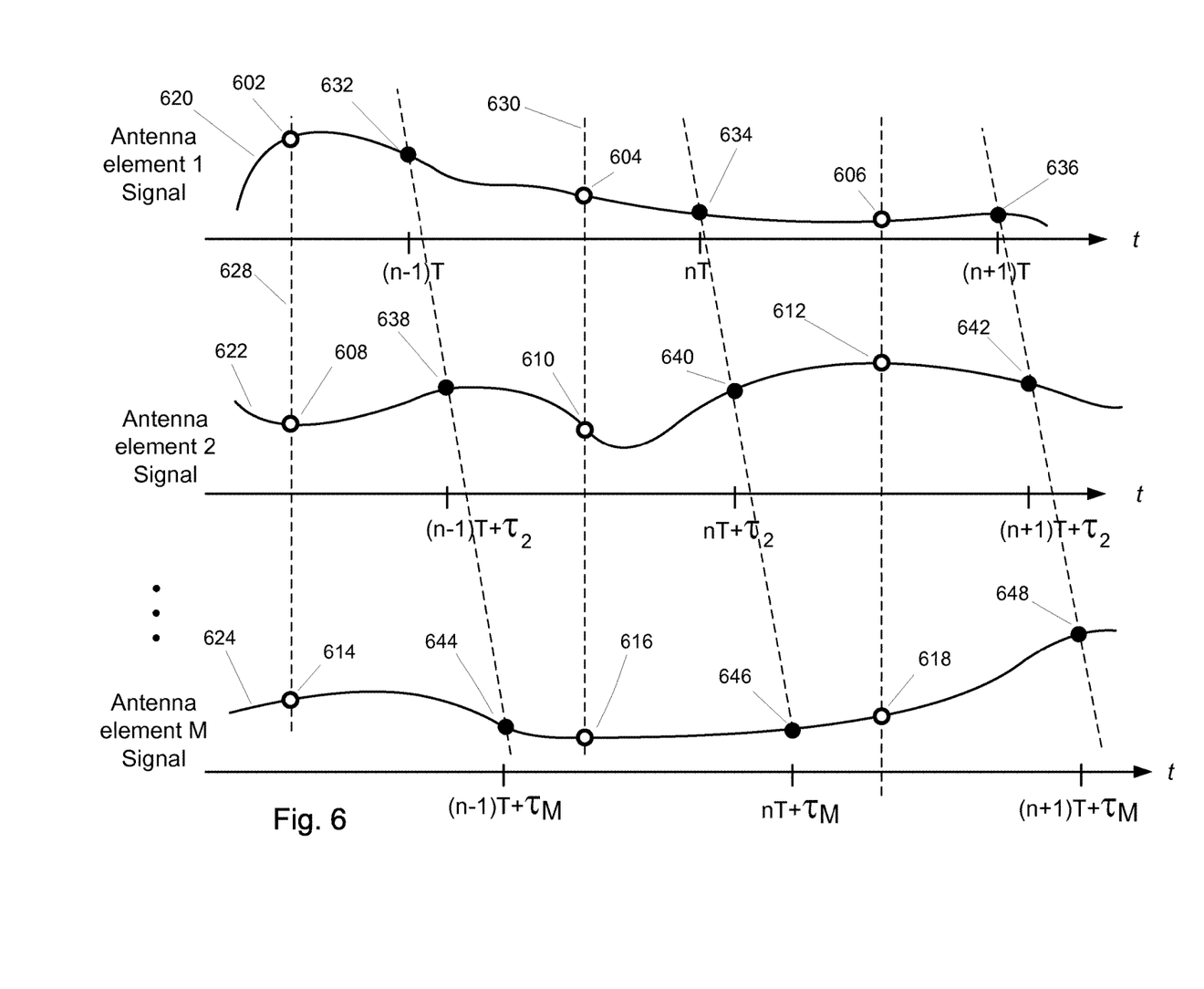
FIG. 6 is a signal diagram illustrating interpolation of multiplexed samples to align timing for all antennas.

FIG. 6 is a signal diagram illustrating the operation of the interpolator 270, 470, 570 to offset the time of the data samples and thus establish a proper timing relationship between the digital samples that are output from the DSP 280, 480, 580, and thus the analog signals to be transmitted by each antenna element 220, 420, 520.

Typically, the samples 602, 608, 614 representing each of the analog signals 620, 622, 624 that are to be transmitted are taken from an analog input signal at the same time by parallel analog to digital converters (ADCs). Alternatively, the digital samples representing the analog signals 620, 622, 624 are generated in the DSP 280, 480, 580. In either case, the digital samples 602, 608, 614 represent the amplitude of each analog signal 620, 622, 624 at the same time (indicated by the vertical dotted line 628). That is, the first sample 602, 608, 614 of each digital signal (i.e., stream of digital samples) represents the same first point in time 628 in each analog signal 620, 622, 624, the second sample 604, 610, 616 of each digital signal represents the same second point in time 630 in each analog signal 620, 622, 624, etc.

Since the mux 275, 475, 575 selects one sample at a time, the multiplexed stream of samples 238, 438, 538 provided to the DAC 234, 434, 534 will not allow the DAC 234, 434, 534 to convert all of the samples that were taken at the same time. That is, if there were no interpolation performed, the first sample 602 representing the first analog signal 620 would converted first. The first sample 608 representing the second analog signal 622 would then converted a short time later. Finally, the first sample representing the $M^{th}$ analog signal 624 would converted M−1 sample times after the first sample 602 representing the first analog signal 620 was converted. That would result in the analog signal 622 being delayed in time with respect to the analog signal 620. Likewise the analog signal 624 would be delayed with respect to the analog signal 622.

In order to compensate for the delay caused by this skewing of the time at which the samples 602, 608, 614 are converted, the interpolator 270, 470, 570 determines the value of the second analog signal 622 at an offset time (n−1)T. In one embodiment, the value of T is greater than the amount of time required to generate an interpolated value. The interpolator 270, 470, 570 must interpolate the value of the analog signal, since the value at that offset point in time will fall between the first sample 602 and the second sample 608. Those skilled in the art will appreciate that there are several ways in which an interpolator can determine the value of the interpolated sample 632 which falls between the first sample 602 and the second sample 608. It should be noted that the interpolated sample 632 may coincide in time with sample 602, but in one embodiment the interpolated sample 632 is offset by T as shown in FIG. 2 to allow sufficient time for the other interpolated samples 638, 644 to be generated. That is, it may take more than one sample time to generate the interpolated sample 638. In order to establish the desired timing relationship between the first interpolated sample 632 representing the first analog signal 620 and the first interpolated sample 638 representing the second analog signal 622, the first sample 602 must also be interpolated to a later time, as shown by the interpolated sample 632. This will be more fully appreciated from the following.

The first sample 608 representing the second analog signal 622 is interpolated to a point 638 at an offset time (n−1)T+$\tau_2$ that is $\tau_2$ later than the offset time of the first interpolated sample 632. In one embodiment, $\tau_2$ is equal to the amount of time between the selection by the mux 275 of the first interpolated sample 632 corresponding to the first analog signal 620 and the selection by the mux 275 of the first interpolated sample 638 corresponding to the second analog signal 622. Likewise, the first sample 614 representing the $M^{th}$ analog signal 624 is interpolated to a point 648 at an offset time (n−1)T+$\tau_M$ that is $\tau_M$ later than the offset time of the interpolated sample 632. In one embodiment, $\tau_M$ is equal to the amount of time between the selection by the mux 275 of the first interpolated sample 632 representing the first analog signal 620 and the selection by the mux 275 of the first interpolated sample 644 representing the $M^{th}$ analog signal 624.

For consistency of notation, (n−1)T may be expressed as (n−1)T+$\tau_1$. Similarly, nT may be expressed as nT+$\tau_1$, where $\tau_1$=0. The spacing between adjacent $\tau_i$ values (with i ranging between 1 and M) may be uniform (i.e., the acquired samples may lie along lines like the dashed lines of FIG. 6) or non-uniform. In the latter case, the digital signals are said to be offset in time relative to one another by non-uniform time offsets. Such non-uniform time offsets may be employed in a manner akin to spread spectrum techniques, to obtain the benefit of a smallest sampling interval.

In some embodiments, a separate interpolator is not used. Rather, the DSP 280, 480, 580 directly translates samples 602 through 618 to interpolated samples 632 through 648.

It should be noted that one of the things that the DSP 280, 480, 580 does is to process the signals 620, 622, 624 to create the appropriate timing relationships necessary to perform beamforming and to generate the MIMO relationships necessary between the analog signals 620, 622, 624 that are to be transmitted. In some instances, performing the beamforming and MIMO processing in the DSP 280, 480, 580 can alter the point in time that is represented by the samples. However, for ease in describing the presently disclosed method and apparatus, it will be assumed that even after performing the beamforming and MIMO processing, the samples 602 through 648 output from the DSP 280, 480, 580 for each digital signal 620, 622, 624 each represent the same point in time as the corresponding samples in each other digital signal 620, 622, 624 being concurrently output by the DSP.

Figure 7:
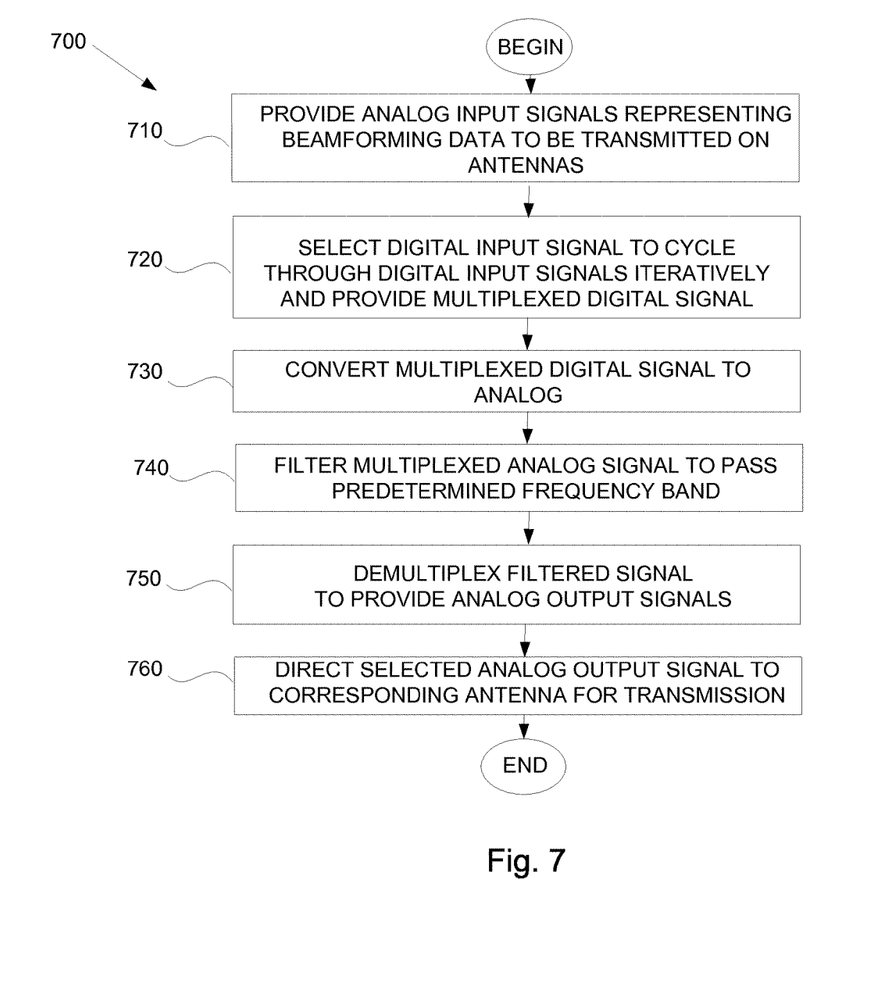
FIG. 7 is a flow diagram illustrating the process used in a system in which antennas are shared by various components of the receive and transmit chain.

FIG. 7 is a flow diagram illustrating the process used in a system in which antenna elements shared various components of the receive and transmit chain. A plurality of digital input signals are provided (710). As noted above, these signals may be generated by the DSP 280, 480, 580 or provided to the DSP 280, 480, 580 by an external component. The digital input signals represent beamforming data to be transmitted on respective antenna elements. One of the digital input signals is selected (720) at a time by a mux. Accordingly, to output a multiplexed digital signal. The multiplexed digital signal is converted (730) to a multiplexed analog signal. The multiplexed analog signal is filtered (740) to pass a predetermined frequency band. The filtered signal is demultiplexed (750) to provide analog output signals. Each analog output signal is directed (760) to a corresponding antenna element for transmission.

Various embodiments find broad applicability in a variety of networking contexts, generally anywhere that MIMO communication is used. For example, various embodiments may be employed in wireless communication systems as well as wireline communication systems such as home networking system utilizing power lines.

While various embodiments of the disclosed method and apparatus have been described above, it should be understood that they have been presented by way of example only, and should not limit the claimed invention. Likewise, the various diagrams may depict an example architectural or other configuration for the disclosed method and apparatus. This is done to aid in understanding the features and functionality that can be included in the disclosed method and apparatus. The claimed invention is not restricted to the illustrated example architectures or configurations, rather the desired features can be implemented using a variety of alternative architectures and configurations. Indeed, it will be apparent to one of skill in the art how alternative functional, logical or physical partitioning and configurations can be implemented to implement the desired features of the disclosed method and apparatus. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed method and apparatus is described above in terms of various embodiments and implementations, it should be understood that the various features, aspects and functionality described in one or more of the individual embodiments are not limited in their applicability to the particular embodiment with which they are described. Thus, the breadth and scope of the claimed invention should not be limited by any of the above-described embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed:

1. A method for beamforming using a plurality of antennas, the method comprising:
   receiving a plurality of digital input signals representing beamforming data to be transmitted on the plurality of antennas, the digital input signals comprising data samples;
   interpolating the data samples to determine for each of the digital input signals, sample values at particular corresponding offset times;
   multiplexing the digital input signals by selecting, one at a time, each of the digital input signals to output a multiplexed digital signal;
   converting the multiplexed digital signal into a first multiplexed analog signal;
   upconverting the first multiplexed analog signal to a second multiplexed analog signal at an output frequency;
   demultiplexing the second multiplexed analog signal to provide a plurality of analog output signals; and
   coupling, one at a time, each of the plurality of analog output signals to a corresponding one of the plurality of antennas for transmission;
   wherein the interpolating is configured such that the offset times are determined to account for the multiplexing of the digital input signals, the demultiplexing of the second multiplexed analog signal, and the coupling of the plurality of analog output signals to the plurality of antennas.

2. The method of claim 1, further comprising controlling a gain of the multiplexed analog signal automatically to ensure correct signal strength of each antenna element.

3. The method of claim 2, wherein controlling a gain of the multiplexed analog signal automatically to ensure correct signal strength of each antenna element comprises synchronizing the operations of multiplexing the digital input signals and controlling the gain of the multiplexed analog signal.

4. The method of claim 1, wherein the data samples are offset in time relative to one another by non-uniform time offsets.

5. The method of claim 1, wherein coupling each selected analog signal comprises electrically terminating only the antenna element corresponding to the selected analog output signal, and disconnecting the other antenna elements.

6. The method of claim 1, wherein multiple samples of one of the digital input signals are consecutively converted to analog before a next one of the digital input signal is selected.

7. The method of claim 1, wherein each digital input signal is selected for a substantially equivalent amount of time.

8. The method of claim 1, wherein each of the digital input corresponds to a signal received from a respective input antenna.

9. The method of claim 1, further comprising amplifying the multiplexed analog signal and adjusting a dynamic range of the transmitter by synchronizing the amplification with the multiplexing.

10. The method of claim 1, wherein coupling, one at a time, each of the plurality of analog output signals to a corresponding one of the plurality of antennas for transmission comprises coupling, one at a time, each of the plurality of antennas to an amplifier configured to amplify the multiplexed analog signal.

11. The method of claim 1, further comprising synchronizing the multiplexing with the amplification to improve system performance.

12. A communication apparatus comprising:
a digital processing module comprising:
an interpolator that interpolates data samples in a plurality of digital input signals to determine for each of the digital input signals, sample values at particular corresponding offset times, wherein the plurality of digital input signals corresponds to data to be transmitted; and
a multiplexer that:
selects, one at a time, each of the plurality of digital input signals one at a time; and
outputs a multiplexed digital signal based on the selected digital input signals;
a transmitter comprising:
a digital to analog converter (DAC) configured to convert the multiplexed digital signal to a first multiplexed analog signal,
a local oscillator,
a mixer configured to upconvert the first multiplexed analog signal to a second multiplexed analog signal at an output frequency, and
a bandpass filter configured to filter the second multiplexed analog signal by passing a predetermined frequency band; and
a demultiplexer configured to demultiplex the second multiplexed analog signal to provide a plurality of analog output signals to a plurality of antennas by coupling, one at a time, each of the plurality of selected analog output signal to a corresponding one of the plurality of antennas for transmission;
wherein the interpolator is configured to determine the offset times to account for the multiplexing of the digital input signals, the demultiplexing of the second multiplexed analog signal, and the coupling of the plurality of analog output signals to the plurality of antennas.

13. The apparatus of claim 12, wherein the transmitter further comprises a gain controller configured to automatically adjust a gain of the multiplexed analog signal to account for a threshold signal strength of each antenna.

14. The apparatus of claim 12, wherein the digital processing module further comprises:

a digital signal processor configured to align antenna data samples corresponding to respective antennas to a determined time; and
wherein the interpolator is configured to interpolate the aligned antenna data samples to provide the digital input signals at respective ones of the plurality of times.

15. The apparatus of claim 12, wherein the digital processing module further comprises a digital signal processor configured to modulate data samples, corresponding to respective antennas, in phase and amplitude to perform multiple input multiple output (MIMO) spatial multiplexing and beamforming and provide the digital input signals at respective ones of the plurality of times.

16. The communication apparatus of claim 12, wherein the plurality of antennas is configured to transmit only one of the analog output signals at a given time.

17. The communication apparatus of claim 12, wherein the transmitter further comprises an amplifier configured to amplify the second multiplexed analog signal and to adjust a dynamic range of the communication apparatus by synchronizing the amplification with the multiplexing.

18. A communication apparatus comprising:
a digital processing module comprising:
an interpolator that interpolates data samples in a plurality of digital input signals representing beamforming data to be transmitted on a plurality of antenna elements, to determine for each of the digital input signals, sample values at particular corresponding offset times; and
a multiplexer that:
selects, one at a time, each of the plurality of digital input signals; and
outputs a multiplexed digital signal based on the selected digital input signals;
a transmitter comprising:
a digital to analog converter (DAC) configured to convert the multiplexed digital signal to a first multiplexed analog signal, and
a mixer configured to upconvert the first multiplexed analog signal to a second multiplexed analog signal at an output frequency;
a demultiplexer configured to demultiplex the second multiplexed analog signal to provide a plurality of analog output signals;
a plurality of filters, each filter receiving one of the analog output signals and outputting a filtered analog output signal;
wherein:
each antenna element of the plurality of antenna elements is coupled, one at a time, to a corresponding one of the plurality of filters, each antenna element transmitting the filtered analog output signal output by the corresponding filter; and
the interpolator is configured to determine the offset times to account for the multiplexing of the digital input signals, the demultiplexing of the second multiplexed analog signal, and the coupling of the plurality of analog output signals to the plurality of antennas.

19. The apparatus of claim 18, wherein the transmitter further comprises a bandpass filter which receives the multiplexed analog signal, the bandpass filter of the transmitter having a bandwidth wider than a product of a number of antennas and the bandwidth of one of the plurality of filters.

20. The apparatus of claim 18, wherein the transmitter further comprises an amplifier configured to amplify the second multiplexed analog signal and to adjust a dynamic range of the communication apparatus by synchronizing the amplification with the multiplexing.

21. A communication apparatus comprising:
a digital processing module comprising:
   a plurality of multiplexers, wherein each multiplexer:
      selects, one at a time, a digital input signal from among a unique plurality of digital input signals received by each multiplexer; and
      outputs a multiplexed digital signal based on the one-at-a-time selection among the digital input signals; and
   an interpolator that:
      provide based on digital streams corresponding to data to be transmitted, to each multiplexer the plurality of digital input signals received by the multiplexer; and
      interpolates data samples in the digital streams, to determine for each digital input signal, sample values at particular corresponding offset times; and
a plurality of transmitters, each transmitter comprising:
   a digital to analog converter (DAC) associated with a corresponding one of the multiplexed digital signals, the DAC converting the corresponding multiplexed digital signal to a multiplexed analog signal, and
   a bandpass filter associated with a corresponding multiplexed digital signal, the bandpass filter filtering the corresponding multiplexed analog signal;
a plurality of demultiplexers, each demultiplexer configured to demultiplex a corresponding multiplexed analog signal to provide a group of analog output signals among a plurality of groups of analog output signals; and
a plurality of antennas grouped into multiple antenna array, each antenna array comprising multiple antenna elements, the antenna elements configured to transmit, one at a time, respective ones of a corresponding group of analog output signals by coupling, one at a time, each of the plurality of selected analog output signals signal to a corresponding one of the plurality of antenna elements for transmission.

22. The apparatus of claim 21, wherein the digital processing module further comprises:
a digital signal processor configured to align antenna data samples corresponding to respective antennas to a determined time; and
wherein the interpolator is configured to interpolate the aligned antenna data samples to provide groups of digital input signals, wherein the digital input signals of each group provided at respective ones of the plurality of times.

* * * * *